United States Patent [19]

Zeigler

[11] Patent Number: 5,255,818
[45] Date of Patent: Oct. 26, 1993

[54] PLATE DISPENSER

[76] Inventor: Timothy P. Zeigler, 2202 Cypress Bend Dr., Apt. 305, Pompano Beach, Fla. 33069

[21] Appl. No.: 946,633

[22] Filed: Sep. 18, 1992

[51] Int. Cl.$^5$ .............................................. A47K 10/24
[52] U.S. Cl. ..................................... 221/45; 221/55; 312/42
[58] Field of Search ....................... 221/45, 55, 58, 48, 221/63, 280, 283, 61; 312/42, 43

[56] References Cited

U.S. PATENT DOCUMENTS

| | | | |
|---|---|---|---|
| Re. 21,398 | 3/1940 | Thor | 221/55 |
| 1,750,568 | 3/1930 | Carew | 221/63 |
| 3,930,698 | 1/1976 | Colgan | 312/43 |
| 4,706,844 | 11/1987 | Omdoll et al. | 221/45 |
| 4,768,679 | 9/1988 | Matsui | 221/55 |
| 4,799,606 | 1/1989 | Vershbow | 221/280 |
| 4,874,112 | 10/1989 | Mulder et al. | 221/1 |
| 4,930,662 | 6/1990 | Carrillo | 221/45 |
| 5,060,807 | 10/1991 | Beagle | 211/41 |
| 5,074,431 | 12/1991 | Sendelbach | 221/45 |

Primary Examiner—Robert P. Olszewski
Assistant Examiner—Kenneth Noland
Attorney, Agent, or Firm—Oltman and Flynn

[57] ABSTRACT

An apparatus for dispensing plates includes a housing for containing a stack of the plates, the housing including a flexible side walls and plate supporting members, the side wall having an open portion with a width of at least the diameter of one of the plates, and a top member extending above the open portion, and a retaining member extending downwardly from the top member for blocking the withdrawal of all but the lowermost plate in the stack. The retaining member has an inner face directed toward the stack, and the inner face is preferably made of a high-friction material. The flexible retaining member preferably has two spaced apart, downwardly directed lobe portions and a narrowed portion between the lobe portions, such that the lobe portions extend essentially to the level of the lowermost plate and each lobe portion makes contact with a plurality of the plates in the stack, when the lowermost plate is pulled through the open portion of the side wall. The housing preferably includes two opposing, vertical side walls, each side wall being attached to an inwardly directed plate support flange. A securing structure is preferably provided on the housing for securing the housing to the underside of horizontal member, such as the bottom panel of a kitchen cabinet.

9 Claims, 2 Drawing Sheets

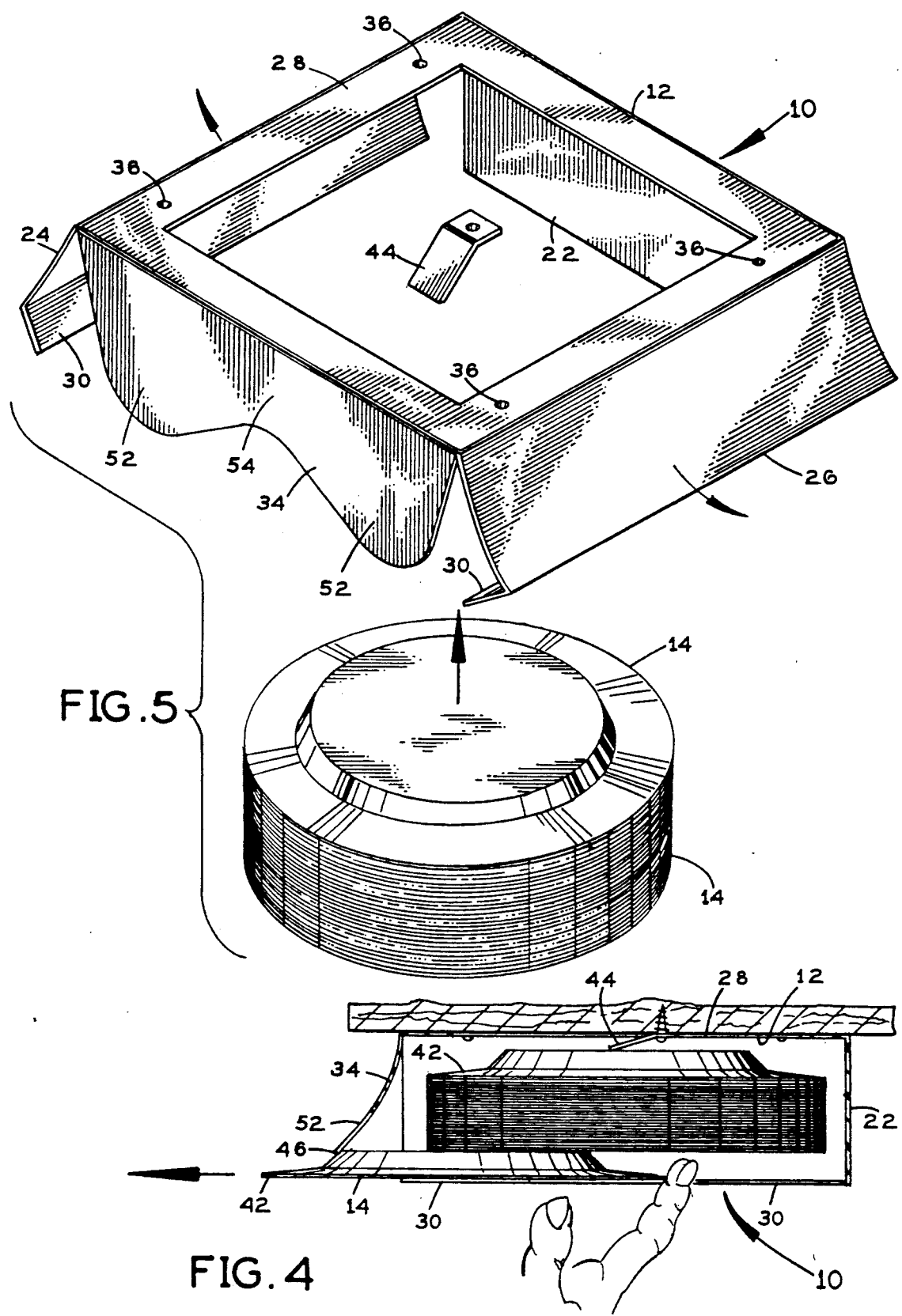

PLATE DISPENSER

BACKGROUND OF THE INVENTION

1. Field of the Invention

The present invention relates generally to the field of dispensers for stackable vessels, and more specifically to paper plate dispenser which can be attached to the underside of kitchen cabinet or the side of a microwave oven or other suitable structure, the dispenser including a housing for containing a stack of plates having two opposing, vertical side walls made of resilient, flexible material and a front retaining barrier for preventing the removal of all but the lowermost plate through the front of the housing, the side wells being spaced apart at e distance slightly larger then the diameter of the plates to be dispensed, each having a plate support flange projecting inwardly from the bottom edge of each side wall, such that the plates can be loaded from underneath by spreading the side walls and support flanges, and then allowing the walls end flanges to resiliently return to their original positions, a mounting flange projecting inwardly from the top edge of each side wall, through which mounting fasteners can be inserted, or to which double-sided adhesive tape or hook and loop type fasteners c be secure, end a spring member for holding the plates against the plate support flanges.

2. Description of the Prior Art

There have long been devices for dispensing stackable vessels. A problem with these devices is that they can be awkward to use. Another problem is that they typically deform and weaken the vessel. Once a paper plate has been bent, for example, its strength is reduced and it is more likely to collapse with the weight of food.

An example of such a dispenser is that of Sendelbach, U.S. Pat. No. 5,074,431, issued on Dec. 24, 1991. Sendelbach teaches a container having a tubular side wall for holding a stack of paper plates. The tubular side wall has a flange projecting inwardly from a 300 degree span of its bottom edge for supporting the plates. A user grasps the edge of the lowermost plate through the bottom of the container along the 60 degree gap in the flange, and pulls the plate axially downward. The plate is thereby dispensed after being "flexed or warped" to clear the flange. A problem with Sendelbach is that one must feel along the bottom of the container to find the gap in the flange. Then one must deform and weaken the plate to remove it.

Beagle, U.S. Pat. No. 5,060,807, issued on Oct. 29, 1991, discloses a disposable dispenser for pet feeding bowls. A disk-shaped base member has three equally spaced apart, upwardly extending containing arms along its edge. A plate retaining tooth extends radially inward from the top of each arm. Spring biasing elements are provided on the base member, so that a stack of bowls fit downward between the arms is biased upward against the retaining teeth. To remove the top bowl from in the stack, one deforms the bowl to avoid the retaining teeth and lifts it out of the dispenser. A problem with Beagle is that, once again, the bowl must be deformed during removal. Another problem is that the stack of bowls is exposed and may be considered aesthetically undesirable.

Carrillo, U.S. Pat. No. 4,930,662, issued on Jun. 5, 1990, teaches a drum-shaped, flexible plate dispenser for attachment to the underside of a cabinet. The circular bottom wall of the dispenser has a cut-away edge portion and the tubular side has a contiguous cut-away portion. The lowermost plate is stated to be deformed as it is extracted through these cut-away portions. Thus the problem of bent and weakened plates is again presented.

Mulder, U.S. Pat. No. 4,874,112, issued on Oct. 17, 1989, reveals a dispenser for filters, of the type used on many automatic coffee makers. Mulder teaches a box having a square top for fastening underneath a cabinet or other fixture, and a bottom in the form of two opposing flanges. The flanges retain a stack of filters within the box and two narrow cutaway sections are provided in the sides of the box between the flanges. A filter is dispensed by pulling on a tab projecting from the filter and thereby causing the filter to deform and slide between the flanges. Once again, the vessel is deformed during removal. Also, pulling the vessel axially downward is relatively awkward. The natural and most comfortable direction for a person to pull is toward the person.

Vershbow, U.S. Pat. No. 4,799,606, issued on Jan. 24, 1989, teaches a spring-loaded plate dispensing device. Vershbow is similar to Beagle, except that a containing box is provided in place of the vertical arms. A coil spring is mounted at the bottom of the box and the top edge has an inwardly directed, flexible retaining member. The edges of the plates fan apart opposite the retaining member. A top corner of the side walls is cut away for easier gripping of the edge of the uppermost plate for removal. The plates are pulled out of the box along the axis of the coil spring. A problem with Vershbow is that the spring occupies space within the box and thus the box must be larger and bulkier. The spring feature also makes the dispenser more expensive. Finally, the Vershbow dispenser is not well suited to mounting under a kitchen cabinet or equivalent structure. If the open top were directed downward or sideways, the action of gravity on the fanned plates could make them fall out.

Colgan, U.S. Pat. No. 3,930,698, issued on Jan. 6, 1976, discloses a plate dispenser having a housing with a bottom wall, a top wall and a tubular side wall. The housing contains a stack of plates. The bottom wall has a centrally located, upward projecting disk portion which bears against the middle of the bottom plate, pushing it tightly against the next higher plate. The bottom wall also has an arcuately shaped opening for exposing a portion of the lowermost plate in a stack. The side wall has a slot exposing edges of several lower plates. The user grips the edge of the lowermost plate through the slot and pulls it both radially and downwardly through the arcuate opening in the bottom wall. A problem with Colgan is that the user must separate the edge of the bottom plate from the stack with their fingernails, to pull the plate out. The central disk portion of the bottom wall would create too much friction between the plates to permit separation without this inconvenient procedure.

Carew, U.S. Pat. No. 1,750,568, issued on Mar. 11, 1930, teaches a bowl-shaped holder for a single plate, the holder having plate rim gripping elements. The purpose of the invention is to provide support for a flexible paper plate while it is in use, and then the plate is pulled out of the holder and discarded. Then the holder is inverted and placed over an inverted stack of similar plates. The gripping elements grip the uppermost plate so that it is retained in the holder when the holder is again picked up for use. A problem with Carew is that an automatic, plate storing apparatus is not provided. Carew provides more of a support function for early-style paper plates than a dispensing function.

It is thus an object of the present invention to provide an apparatus for dispensing paper plates which conceals a stack of such plates in an aesthetically pleasing housing.

It is another object of the present invention to provide such an apparatus which can be mounted under a kitchen cabinet or to any other suitable structure for convenient access, using double-sided tape, hook and loop type fasteners, or any other conventional fasteners.

It is another object of the present invention to provide such an apparatus which permits the removal of a plate with a single action and without deforming and weakening the plate.

It is still another object of the present invention to provide such an apparatus which holds a stack of paper plates against support members with a biasing member so that a plate is always adjacent to a plate removal port.

It is still another object of the present invention to provide such an apparatus which can receive a stack of paper plates by spreading resilient retaining walls and then permitting the walls to return to their original positions.

It is finally an object of the present invention to provide such an apparatus which is simple in design, reliable and inexpensive to manufacture.

SUMMARY OF THE INVENTION

The present invention accomplishes the above-stated objectives, as well as others, as may be determined by a fair reading and interpretation of the entire specification.

An apparatus is provided for dispensing plates, including a housing for containing a stack of the plates, the housing including a flexible side wall and plate supporting members, the side wall having an open portion with a width of at least the diameter of one of the plates, and a top member extending above the open portion, and a retaining member extending downwardly from the top member for blocking the withdrawal of all but the lowermost plate in the stack. The retaining member has an inner face directed toward the stack, and the inner face is preferably made of a high-friction material. The flexible retaining member preferably has two spaced apart, downwardly directed lobe portions and a narrowed portion between the lobe portions, such that the lobe portions extend essentially to the level of the lowermost plate and each lobe portion makes contact with a plurality of the plates in the stack, when the lowermost plate is pulled through the open portion of the side wall. The housing preferably includes two opposing, vertical side walls, each side wall being attached to an inwardly directed plate support flange, and biasing means for holding the plates against the support flange. A securing structure is preferably provided for securing the housing to the underside of horizontal member, such as the bottom panel of a kitchen cabinet.

BRIEF DESCRIPTION OF THE DRAWINGS

Various other objects, advantages, and features of the invention will become apparent to those skilled in the art from the following discussion taken in conjunction with the following drawings, in which:

FIG. 4 is a cross-sectional side view of the preferred embodiment, showing how the flexible, resilient barrier holds the stack of plates in the housing while the lowermost plate is pulled out.

FIG. 5 is a perspective view of the preferred embodiment, illustrating the separation of the flexible side walls to insert a stack of plates.

DETAILED DESCRIPTION OF THE PREFERRED EMBODIMENTS

Figure 3:
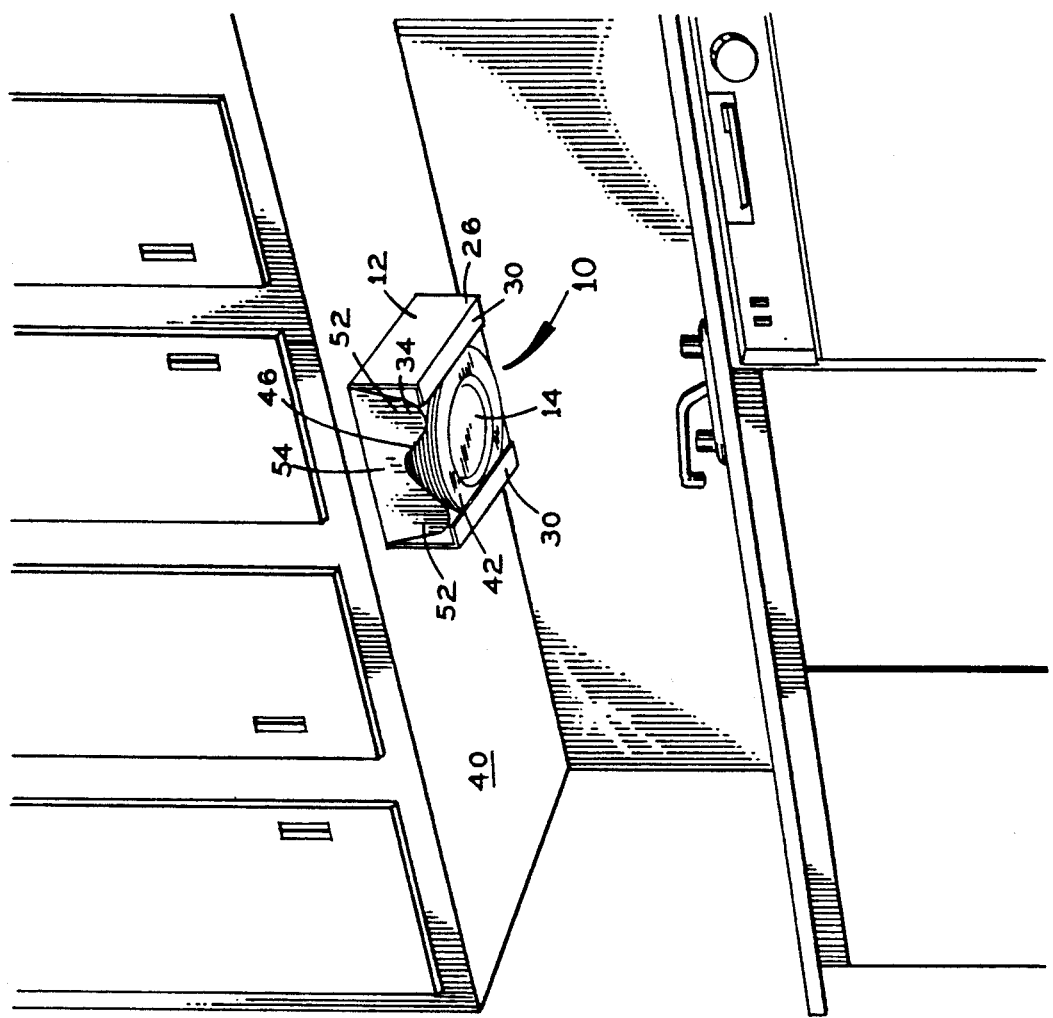
FIG. 3 is a perspective view of the underside of the inventive apparatus, showing the apparatus attached to the bottom of a kitchen cabinet.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 1:
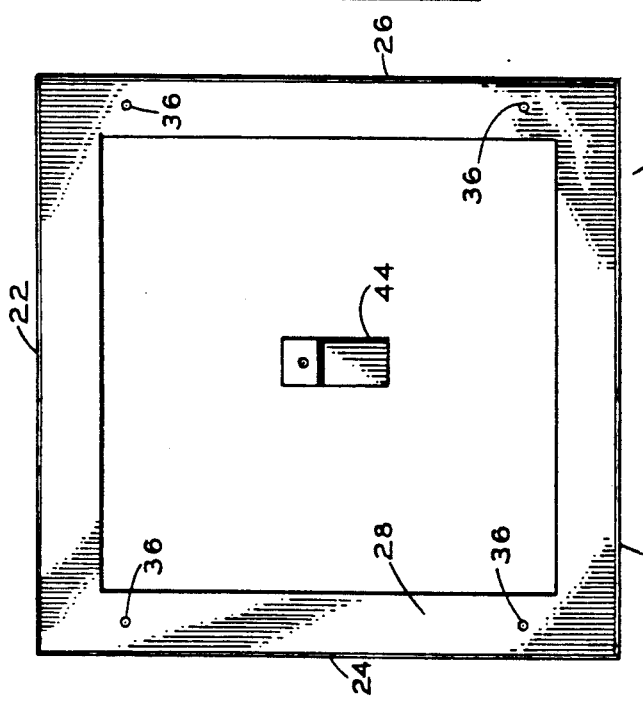
FIG. 1 is a top projection view of the preferred embodiment of the inventive apparatus, showing the top frame member and the fastener holes.
Figure 2:
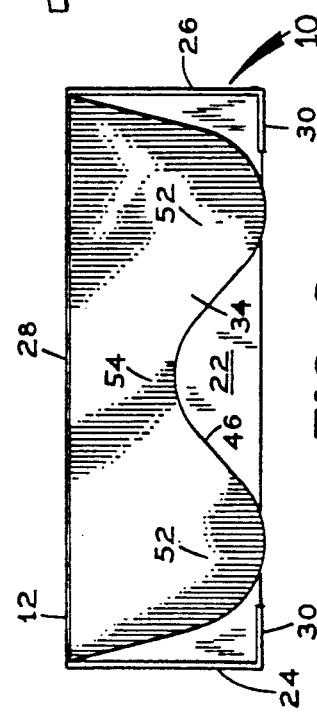
FIG. 2 is a front projection view of FIG. 1, showing the preferred configuration of the inventive flexible barrier.

Referring to FIGS. 1 and 2, a paper plate dispensing apparatus 10 is disclosed, including a housing 12 for holding a stack of plates 14. Housing 12 has a vertical back wall 22, two opposing, resilient vertical side walls 24 and 26, and a top frame member 28 connecting walls 22, 24 and 26. The lower edge 32 of each wall 24 and 26, and optionally of wall 22, has an inwardly directed flange member 30 for supporting a stack of plates 14 within housing 12. A retaining barrier 34 is provided opposite back wall 22 and extends from top frame member 28 downward to the approximate level of flange members 30.

Housing 12 preferably has a square horizontal cross-section end an interior width slightly larger than the diameter of plates 14. Fasteners are preferably inserted through holes 36 in top frame member 28 to secure housing 12 to the underside of a kitchen cabinet 40 or other suitable structure. See FIG. 3. Equivalently, double-sided tape or hook and loop type fasteners such as VELCRO ™ may be secured to the upper face of frame member 28 and to the underside of cabinet 40. This means of attachment is particularly useful in mounting the dispenser vertically on the side of a microwave oven.

A biasing member such as a leaf spring 44 is preferably provided for biasing the stack of plates 14 against the inwardly directed flange members 30. Leaf spring 44 is preferably a strip of resilient plastic bet at an obtuse angle and having an opening for receiving screw or bolt, which is fasten to the underside of cabinet 40 over the stack of plates 14. See FIGS. 1 and 4.

Vertical side walls 24 and 26 are also preferably made of a flexible, resilient plastic. To load a stack of plates 14 into apparatus 10, the use grips wells 24 and 26 and spreads them apart so that the stack of plates 14 can be inserted between flange members 30. See FIG. 5. Then, after inserting the stack of plates 14 into apparatus 10, walls 24 and 26 re permitted to resiliently return to their original vertical positions. Flange members 30 move under the edges of the lowest plate 14 and support the stack of plates 14.

Barrier 34 is optionally flexible and resilient, and made of a high friction material. A user takes a plate 14 from apparatus 10 by placing their hand under housing 12 and between flange members 30, and pressing lightly against the lowermost plate 14 Then the user pulls this plate 14 horizontally forward and away from back wall 22. All plates 14 in the stack are thereby initially moved in this forward direction. Barrier 34 resiliently drags against the edges 42 of plates 14, retarding their movement. Since the friction between a hand and the bottom plate 14 is greater than the friction between plates 14 themselves, only the lowermost plate 14 continues to move against the barrier 34 resistance. Since the bottom plate 14 is nearest to the free lower end 46 of barrier 34, its leading edge 42 passes under end 46 first, so that resistance to its movement stops while resistance to the movement of the other plates 14 remains. See FIG. 4.

The preferred shape of barrier 34 is as illustrated in FIG. 2, having two wide, outer lobe portions 52 and a narrow middle portion 54. This is not only decorative in appearance, but also causes barrier 34 to make contact with plates 14 at two points rather than one. This enhances the desired drag and separating effect of barrier 34.

It is to be understood that top frame member 28 need not be a continuous flange, but could equivalently be a solid wall or discreet, inward projecting tabs. Also, housing 12 need not be square in its horizontal cross-section. Equivalent housing 12 structures could have rectangular, circular or many other cross-sectional shapes. A flange member 30 is optional on back wall 22.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for dispensing plates, comprising:
a housing for containing a stack of said plates, said housing comprising a side wall and plate supporting means, said plates in said stack having edges and being mutually parallel and essentially perpendicular to said side wall, said side wall having an open portion with a width of at least the diameter of one of said plates, and a top member extending above said open portion,
a retaining member extending downwardly from said top member and essentially perpendicular to and over the edges of said plates for blocking the withdrawal of all but the lowermost plate in said stack.

2. An apparatus according to claim 1, wherein said retaining member is flexible and resilient.

3. An apparatus according to claim 2, wherein said retaining member has an inner face directed toward said stack, and said inner face is made of a high-friction material.

4. An apparatus according to claim 1, wherein said flexible retaining member has two spaced apart, downwardly directed lobe portions and a narrowed portion between said lobe portions, such that said lobe portions extend essentially to the level of said lowermost plate and each said lobe portion makes contact with a plurality of said plates in said stack, when said lowermost plate is pulled through said open portion of said side wall.

5. An apparatus according to claim 1, wherein said housing comprises:
two opposing, vertical side walls, each said side wall being attached to an inwardly directed plate support flange.

6. An apparatus according to claim 1, wherein securing means are provided on said housing for securing said housing to the underside of a horizontal member, such as the bottom panel of a kitchen cabinet.

7. An apparatus according to claim 6, additionally comprising:
biasing means within said housing for holding said stack of plates against said inwardly directed plate support flange.

8. An apparatus for dispensing plates, comprising:
a housing for containing a stack of said plates, said housing comprising a side wall and plate supporting means, said side wall having an open portion with a width of at least the diameter of one of said plates, and a top member extending above said open portion,
a retaining member extending downwardly from said top member for blocking the withdrawal of all but the lowermost plate in said stack,
wherein said flexible retaining member has two spaced apart, downwardly directed lobe portions and a narrowed portion between said lobe portions, such that said lobe portions extend essentially to the level of said lowermost plate and each said lobe portion makes contact with a plurality of said plates in said stack, when said lowermost plate is pulled through said open portion of said side wall.

9. An apparatus for dispensing plates, comprising:
a housing for containing a stack of said plates, said housing comprising a side wall and plate supporting means, said side wall having an open portion with a width of at least the diameter of one of said plates, and a top member extending above said open portion,
a retaining member extending downwardly from said top member for blocking the withdrawal of all but the lowermost plate in said stack, wherein said housing comprises two opposing, vertical side walls, each said side wall being attached to an inwardly directed plate support flange.

* * * * *